(12) United States Patent
Giurgiu et al.

(10) Patent No.: US 10,657,804 B2
(45) Date of Patent: May 19, 2020

(54) UPDATING MAPS AND ROAD STATUS

(71) Applicant: HERE Global B.V., Eindhoven (NL)

(72) Inventors: Gavril Giurgiu, Deerfield, IL (US);
Anton Anastassov, Naperville, IL (US);
Dongwook Jang, Lisle, IL (US);
Joshua Thompson, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 132 days.

(21) Appl. No.: 15/675,188

(22) Filed: Aug. 11, 2017

(65) Prior Publication Data

US 2019/0051153 A1    Feb. 14, 2019

(51) Int. Cl.

| | |
|---|---|
| *G01C 21/26* | (2006.01) |
| *G01C 21/00* | (2006.01) |
| *G01C 21/32* | (2006.01) |
| *G08G 1/01* | (2006.01) |
| *G01C 21/36* | (2006.01) |

(52) U.S. Cl.
CPC ........... *G08G 1/0112* (2013.01); *G01C 21/32* (2013.01); *G01C 21/3691* (2013.01)

(58) Field of Classification Search
None
See application file for complete search history.

(56) References Cited

U.S. PATENT DOCUMENTS

| | | | |
|---|---|---|---|
| 9,459,626 | B2 | 10/2016 | Chen et al. |
| 9,613,455 | B1 * | 4/2017 | Nelson ................. G01C 21/32 |
| 2012/0023057 | A1 | 1/2012 | Winberry et al. |
| 2014/0303806 | A1 * | 10/2014 | Bai ..................... G01C 21/3697 701/1 |
| 2016/0161265 | A1 * | 6/2016 | Bagheri ................ G01C 21/32 701/450 |

FOREIGN PATENT DOCUMENTS

| | | |
|---|---|---|
| EP | 3130891 A1 | 2/2017 |
| JP | 2008003253 A | 1/2008 |
| WO | WO2014072141 A1 | 5/2014 |

* cited by examiner

*Primary Examiner* — Adam D Tissot

(74) *Attorney, Agent, or Firm* — Lempia Summerfield Katz LLC

(57) ABSTRACT

Apparatus and methods are described for updating a geographic database based on road object probabilities. For example, an initial value set for an existence probability that a road object exists is determined. Observation data collected from sensors of vehicles are received. A total quantity of the observation data include a first quantity of vehicles that observed a presence of the road object and a second quantity of the vehicles observed an absence of the road object. A presence probability indicative of a likelihood that observation data accurately describe the road object and an absence probability indicative of a likelihood that observation data accurately describe the road object are calculated to determine an updated value for the existence probability. A geographic database is updated in response to the comparison of the updated value for the existence probability to a threshold confidence level.

20 Claims, 14 Drawing Sheets

UPDATING MAPS AND ROAD STATUS

FIELD

The following disclosure relates to map updates, and more particularly, map updates from a fleet of connected vehicles.

BACKGROUND

Map databases may be used to provide navigation based features such as routing instructions for an optimum route from an original location to a destination location and map based features such as section and display of maps to manually locate locations or points of interest. Map databases are used in driver assistance systems or driverless systems. Map databases are also used in systems that improve vehicle fuel economy, such as systems that optimize transmission gear selection taking into account upcoming slope and speed changes.

Map attributes often change over time. As new roads are built, other roads are closed, speed limits change, or locations of business are changed, the geographic database should be updated. Real world observations may be indicative of the map attribute changes. Crowd sourcing may be used to receive update information from users. The data may be unreliable in some circumstances. Challenges remain in evaluating crowdsourced data for updating map attributes.

SUMMARY

In an embodiment, a method for updating a geographic database includes determining an initial value set for an existence probability that a road object exists; receiving observation data based on sensors of a plurality of vehicles. A first quantity of the plurality of vehicles observed a presence of the road object, and a second quantity of the plurality of vehicles observed an absence of the road object. The method further includes calculating, using a processor, a presence probability based on the first quantity of the plurality of vehicles, the presence probability indicative of a likelihood that observation data from the first quantity of the plurality of vehicles accurately describe the road object, calculating, using the processor, an absence probability based on the second quantity of the plurality of vehicles, the absence probability indicative of a likelihood that observation data from the second quantity of the plurality vehicles accurately describe the absence of the road object, calculating, using the processor, an updated value for the existence probability that the road object exists based on the initial value set, the presence probability, and the absence probability, performing, using the processor, a comparison of the updated value for the existence probability to a threshold confidence level, and updating the geographic database as a function of the comparison of the updated value for the existence probability to the threshold confidence level.

In another embodiment, an apparatus for updating a geographic database includes a geographic database, a memory, a communication interface, and a controller. The geographic database includes a plurality of road segments, at least one road segment associated with a road object attribute. The memory is configured to store an initial value set for an existence probability that a road object exists. The communication interface is configured to receive observation data from sensors of a plurality of vehicles. A first quantity of the plurality of vehicles observed a presence of the road object, and a second quantity of the plurality of vehicles observed an absence of the road object. The controller is configured to calculate a presence probability indicative of a likelihood that observation data from the first quantity of the plurality of vehicles accurately describe the road object, an absence probability indicative of a likelihood that observation data from the second quantity of the plurality vehicles accurately describe the road object, and an updated value for the existence probability that the road object exists based on the initial value set, the presence probability, and the absence probability.

In another embodiment, an apparatus includes a sensor, a position detector, and a controller. The sensor is configured to receive sensor data indicative of a road object. The position detector is configured to determine a geographic position associated with the road object. The controller is configured to select the sensor data indicative of the road object and the geographic position associated with the road object, wherein observation data from a plurality of vehicles including the sensor data and the geographic position are analyzed to calculate a presence probability indicative of a likelihood that observation data from a first quantity vehicles accurately describe the road object, an absence probability indicative of a likelihood that observation data from the second quantity of the plurality vehicles accurately describe the road object, and an updated value for an existence probability that the road object exists based the presence probability and the absence probability.

BRIEF DESCRIPTION OF THE DRAWINGS

Exemplary embodiments of the present invention are described herein with reference to the following drawings.

DETAILED DESCRIPTION

Figure 1:
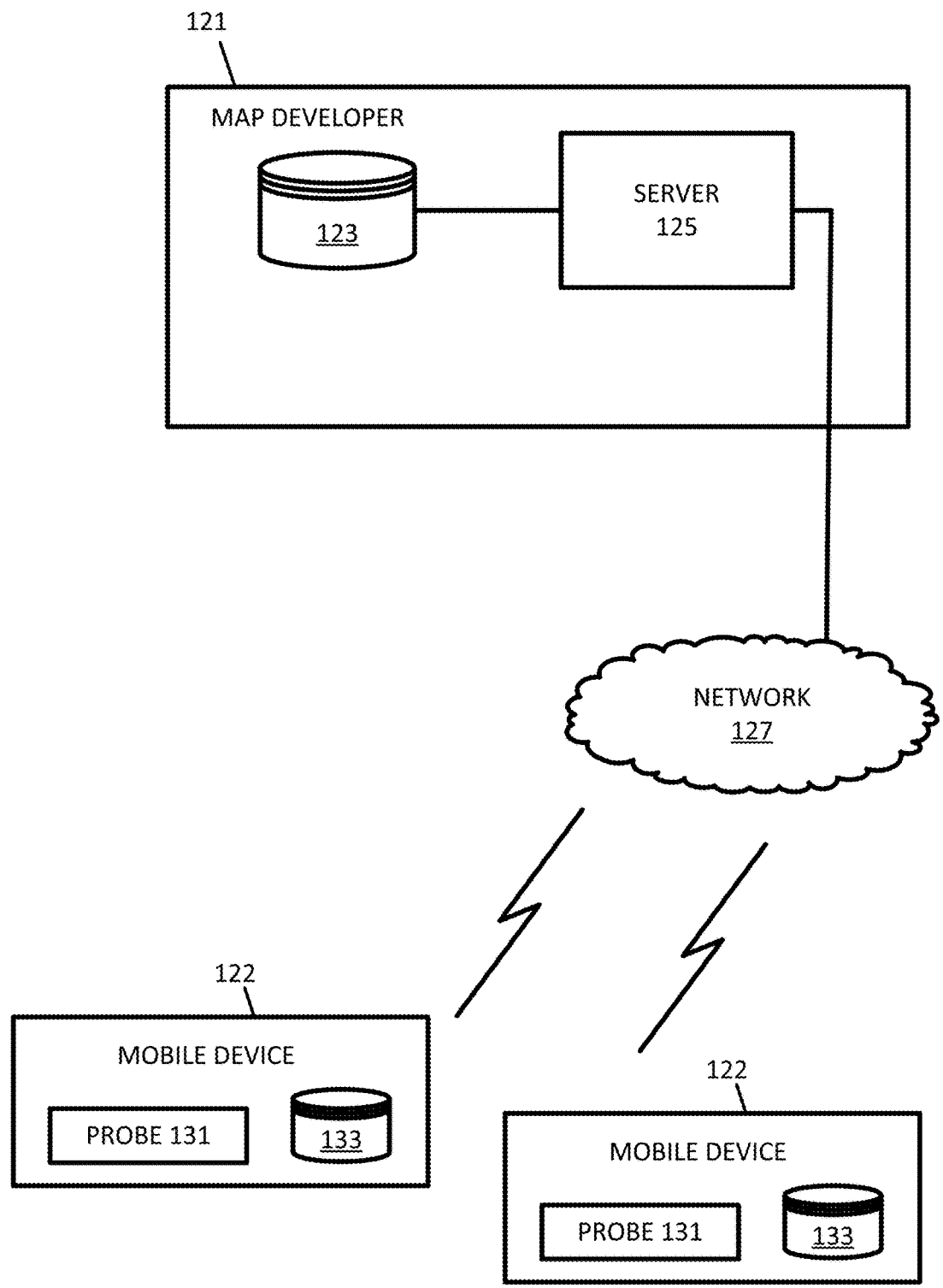
FIG. 1 illustrates an example system for map updates.

A connected vehicle includes a communication device and an environment sensor array. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the Internet.

The sensor array may include one or more sensors configured to detect surroundings of the vehicle, and more specifically, one or more road furniture items. The sensor array may include multiple sensors. Example sensors include an optical distance system such as light detection and ranging (LiDAR), an image capture system such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

A road object is an object within a detectable distance from the roadway using the sensor array. The road object may be a road furniture item. A road furniture item may include any object related to the movement of traffic along a roadway. Example road furniture items include road dividers (physical dividers), traffic signs (e.g., speed limit signs), traffic lights, crosswalks, transit stops, or other physical items that include information on the flow of traffic along the roadway.

The server includes a server map. The server map includes road segments representative of roadways or other pathways, which are linked together at nodes. The server map includes locations names and points of interest at particular geographic locations or location along a road segment. The server map includes road furniture items tied to geographic locations or locations along a road segment. The map at the map server may include a high definition map with the speed limits of road segments, curvature, slope, the direction of travel, length and number of lanes.

The connected vehicle, which may be either integrated in the vehicle or a mobile device of a traveler of the connected vehicle, includes a vehicle map, which is in a format (e.g., schema and values) similar to the server map. The server pushes updates from the server map to the vehicle map. Alternatively, the vehicle may request updates from the server. In either situation, the updates may be made on a predetermined schedule or at a predetermined interval. The predetermined time schedule may dictate that updates occur at certain times during the day (e.g., on the hour, the half hour, or every X minutes past the hour). The predetermined interval may cyclically repeat (e.g., every X minutes).

Road furniture items or road objects may be changed or moved from time to time. As the connected vehicle drive near the road furniture items, the sensor array observes or detects the road furniture items in real time. Updates may be transferred from the vehicle to the server. In turn, at the predetermined time, the server provides the updates to the fleet of vehicles. A fleet of vehicles may include vehicles dispatched for the purpose of collecting data but may also include connected vehicles of any type that may be connected in a fleet only in that the vehicles are from the same manufacturer, share the same map provider for navigation, or have been assigned to collect sensor data. In the alternative, the fleet of vehicles may be vehicles with mobile devices associated with a navigation application, mapping application, or data collection application to collect sensor data.

As updates are transferred from the vehicle to the server based on detected road furniture, it is beneficial not to update the server map after a single vehicle detects the addition or removal of road furniture. For example, consider an example in which multiple vehicles over several weeks detected a road furniture item, but then one vehicle detects that the road furniture item is no longer at the same location. It may be more likely that the vehicle has detected the road furniture, or absence thereof, in error than the road furniture has been removed. However, if more vehicles detect that the road furniture item is no longer as the same location, it may be beneficial to update the map.

The following embodiments includes techniques for updating the map as road furniture items are moved, added, or removed from a roadway. Rather than immediately updating the map when the road furniture is detected, a probability (confidence level) is calculated for the road furniture. The probability is updated over time as additional vehicles detect the road furniture, which increases the probability, and/or additional vehicles that pass the location and do not detect the road furniture, which decreases the probability. When the probability surpasses or falls below a confidence threshold, the map is updated.

Bandwidth and other computing resources are conserved by limited the updates distributed by the server. The bandwidth for updates is reduced through minimizing or eliminating cumulative updates that provide redundant or likely redundant updates. In addition, crowdsourcing efforts to update the map become more reliable and efficient using the following embodiments.

FIG. 1 illustrates an example system 120 for map updates. In FIG. 1, one or more mobile device 122 include probes 131 and are connected to the server 125 though the network 127. A database 123, including the server map, is also connected to the server 125. The database 123 and the server 125 make up a developer system 121. Multiple mobile devices 122 are connected to the server 125 through the network 127. The mobile devices 122 may serve as probes 131 or be coupled with probes 131. The mobile devices 122 include databases 133 corresponding to the vehicle maps. Additional, different, or fewer components may be included.

Data is collected an individual mobile device 122 to update the server map at the server 125. The mobile devices 122 do not update vehicle maps directly. Instead, the mobile devices 122 selectively send updates, based on data collected by probes 131, to the server 125. The server 125 sends out periodic updates to the mobile devices 122.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

Figure 2:
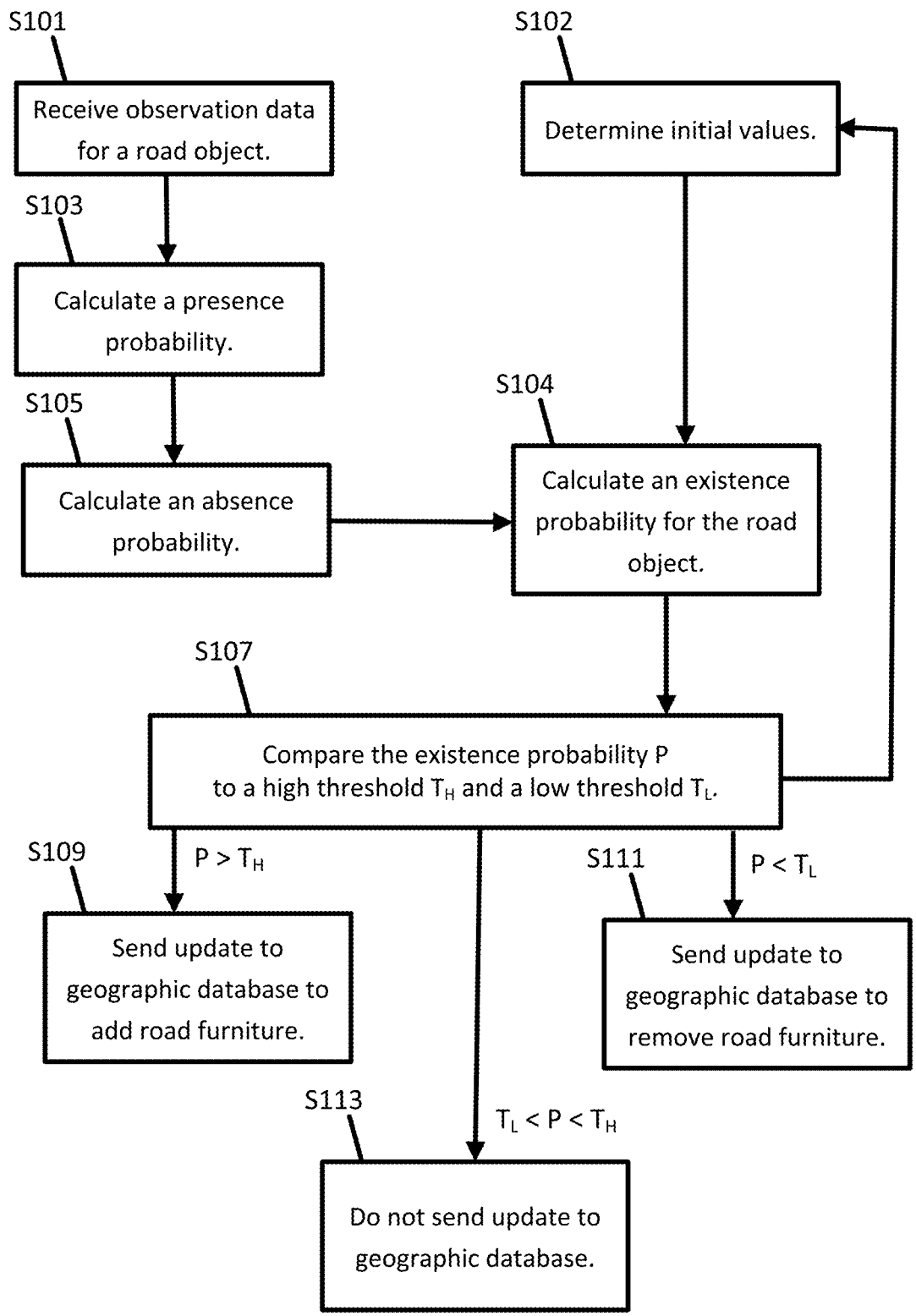
FIG. 2 illustrates an example flowchart for map updates according to road object probabilities.

FIG. 2 illustrates an example flowchart for map updates using the system of FIG. 1. The acts of the flowchart may be performed by mobile device 122, server 125, or a combination thereof. The acts of the flowchart may be performed a road link or road segment basis and repeated for each road link or road segment in a geographic area. The existing road segments of the geographic database may be used. Alternatively, roads may be divided into segments for the purpose of the map updates. The divided road segments have a predetermined length (e.g., 5 feet, 1 meter, or 10 feet). In another example, the acts of the flowchart are performed at a predetermined time interval or by road segment at the predetermined time interval. Additional, different, or fewer acts may be included.

The mobile device 122 receives or probe 131 detects or collects observation data that describes the presence or absence of a road feature in or near the road that the vehicle 122 is traveling on. The road feature may be road objects or aspects of road objects. The road object may be a road furniture item or another object such as a hazard or another vehicle. The probe 131 generates sensor data indicative of the road feature or road object. The probe data may include distance data as generated from the optical distance system (e.g., LiDAR), the image capture system (e.g., camera), the sound distance system (e.g., SONAR), or the radio distance system (e.g., RADAR). The probe data may also include the geographic position of the vehicle 124 (see FIG. 4), and the geographic position of the road feature may be calculated from the geographic position of the vehicle and the associated camera data, LiDAR data, SONAR data, or RADAR data. The geographic position of the road feature may be at an offset from the geographic position of the vehicle 124.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The position circuitry may be included in the mobile device 122 or in another module of the vehicle.

The mobile device 122 may compare the probe data to a template. For example, a two dimensional or a three dimensional template for the road object may be compared to the probe data. The template may include several points that form the shape of the road object. When a predetermined portion of the points of the template match the detected road object, the mobile device 122 may determine that a road object has been detected.

The mobile device 122 may perform an image processing technique on the probe data. Example image processing techniques include an edge detection, feature extraction or transforms (e.g., scale invariant feature transform), or vector classification. In edge detection, the brightness, or another image characteristic, of adjacent image pixels in the probe data. In feature extraction or transforms, the image is analyzed to identify particular features that indicate the layout. Similarly, vector classification may compare vectors representative of boundary elements to vectors from the image.

In some examples, multiple types of probe data may be combined in order to detect and identify the road feature. For example, the three dimensional template may be used to identify the shape of the road object with a comparison of distance or range data. Once the shape has been identified as a sign, the particular type of sign or the insignia of the sign may be identified through one of the image processing techniques.

Referring to FIG. 1, at act S101, the mobile device 122 may receive the observation data from the probe 131 or the server 125 may receive the observation data from the mobile device 122 or multiple vehicles. The server 125 may receive the observation data collected by probes of multiple vehicles over time. Some of the vehicles may detect the presence of a road object at a particular location and other vehicles may not detect, or detect the absence of, the road object at the particular location. In one embodiment the sensor data collected by the probes 131 of the mobile device 122 is forwarded to a manufacturer server or manufacturer cloud service. The manufacturer cloud service may process the sensor data for a fleet of vehicles or a particular manufacturer, including filtering some proprietary data out of the sensor data, standardizing the data set for further analysis by the server 125, or selecting on the sensor data used for detecting road objects. Multiple manufacturers may forward aggregated and pre-processed sensor data from multiple fleets of vehicles to the server 125.

At act S102, the mobile device 122 or the server 125 determines an initial value set for an existence probability that a road object exists. The initial value set may include a presence probability and an absence probability such that a sum of the presence probability and the absence probability is 1. For the first iteration, the initial value may be a predetermined value (e.g., 0.5, 0.3, or 0.8). The initial value may be defined according to ground truth data inferred by direct observation. The initial value may be defined according to a roadway or a region of the map. The initial value may be set according to a percentage of the roadway or the region having road furniture. For example, if the ground truth indicates that road furniture is detectable from 20% of the roadway, the initial value for the roadway is set to 0.20. The initial value may change for each iteration of the calculated as described in more detail below.

At act S103, the mobile device 122 or the server 125 calculates a presence probability based on the first quantity of vehicles. The presence probability is indicative of a likelihood that observation data from the first quantity of vehicles accurately describe the road object. The presence probability of $n_p$ road furniture observations out of N, the total quantity for the vehicles, under the hypothesis that the road furniture exists is given by the binomial probability of Equation 1:

$$P(N, n_p | \exists) = \binom{N}{n_p} \epsilon^{n_p} (1-\epsilon)^{N-n_p} \quad \text{Eq. 1}$$

The binomial probability $P(N, n_p|\exists)$ represents the probability that the first quantity correctly represents the total quantity of vehicles given that the road furniture exists (the term $\exists$ means existing road furniture and $P(\exists)$ represents the prior probability that the road furniture exists). For example, if the road furniture exists, the probability of 2 positive observations that it exists out of 3 cars passing by is:

$$P(3, 2|\exists) = \binom{3}{2} 0.95^2 (1-0.95)^{3-2} = 0.13.$$

The constant ε is an observation efficiency. The observation efficiency may be determined from ground truth. The value f is the false positive rate, FP, or the probability to observe road furniture on a segment where none exists. Examples for f may be 0.01, 0.05, or another value. The false negative rate, 1−ε, is the probability that existing road furniture is not observed from the road segment where it exists. The observation efficiency may be defined ε=1−FN. Examples for the observation efficiency may be 0.99, 0.95 or another value.

At act S105, the mobile device 122 or the server 125 calculates an absence probability based on the second quantity of the vehicles. The absence probability is indicative of a likelihood that observation data from the second quantity of the plurality vehicles accurately describe the road object. The absence probability of $n_p$ road furniture observations out of N, as the total quantity for the vehicles passing by, and using the constant f as the false positive rate, under the hypothesis that the road furniture does not exist is given by the binomial probability of Equation 2:

$$P(N, n_p | \not\exists) = \binom{N}{n_p} f^{n_p} (1-f)^{N-n_p} \quad \text{Eq. 2}$$

The binomial probability $P(N, n_p | \not\exists)$ represents the probability that the second quantity correctly represents the total quantity of vehicles given that the road furniture does not exists (the term $\not\exists$ means nonexistent road furniture and $P(\not\exists)$ represents the prior probability that the road furniture does not exist). For example, if the road furniture does not exist, the probability of 2 observations that is does exist out of 3 vehicles passing by is $$P(3, 2 | \not\exists) = \binom{3}{2} 0.01^2 (1-0.01)^{3-2} = 0.0003.$$

So, for a given segment of this example, given 2 positive observations out of 3 vehicles passing by, the probability that the road furniture exists (13%) is much larger than the probability that the PD does not exist (0.03%). The road furniture existence hypothesis is favored over the hypothesis that the road furniture does not exist.

At act S104, the mobile device 122 or the server 125 calculates an existence probability that the road object exists based on the initial value set, the presence probability, and the absence probability. Through each iteration, an updated value for the existence probability is calculated.

The existence probability, $P(\exists | N_i, n_{p,i})$, that the road object exists is calculated from Equation 3:

$$P(\exists | N_i, n_{p,i}) = \frac{P(N_i, n_{p,i} | \exists) P(\exists)}{P(N_i, n_{p,i} | \exists) P(\exists) + P(N_i, n_{p,i} | \not\exists) P(\not\exists)} \quad \text{Eq. 3}$$

where the initial value includes $P(\exists)$ as a prior probability that the road object is present and $P(\not\exists)$ as a prior a probability that the road object is absent, where $N_i$ is a total quantity for the plurality of vehicles at an ith iteration, and $n_{p,i}$ is a number of positive observations at the ith iteration. The presence probability, $P(N, n_p | \exists)$, may be provided according to Equation 1, and the absence probability, $P(N, n_p | \not\exists)$, may be provided according to Equation 2

At act S107, the mobile device 122 or the server 125 performs a comparison of the updated value for the existence probability to at least one threshold confidence level. The at least one threshold confidence level may include two confidence levels. An addition confidence threshold is the level for the existence probability that is the minimum needed to add the road furniture to the geographic database. No change to add the road furniture is made as long as the existence probability is below the addition confidence threshold. A removal confidence threshold is the level for the existence probability that is the maximum confidence to retain the road furniture to the geographic database. Road furniture is removed from the geographic database once the existence probability falls below the removal confidence threshold.

Thus, the mobile device 122 or the server 125 may perform multiple comparisons using the existence probability. An update is performed to the geographic database as a function of one or more comparisons. That is the result of the comparisons impact whether or not an update is applied to the geographic database. One comparison is made between the existence probability and the addition confidence threshold. At act S109, the geographic database is updated to add the road furniture. The server 125 is configured to add the road object to the geographic database when the comparison of the updated value for the existence probability (P) is greater than the addition confidence threshold ($T_H$) (e.g., $P > T_H$).

Another comparison is made between the existence probability and the removal confidence threshold. At act S111, the geographic database is updated to remove the road furniture. The server 125 is configured to remove the road object from the geographic database when the comparison of the updated value for the existence probability is less than the removal confidence threshold ($T_L$) (e.g., $P < T_L$).

At act S113, when the existence probability is between the removal confidence threshold and the addition confidence threshold (e.g., $T_L < P < T_H$), the geographic database is not updated. More data is collected before an existing road furniture is removed from the geographic database or before a non-existing road furniture is added to the geographic database.

In another embodiment, the comparisons are formed in sequence and only one comparison may be performed. For example, when the comparison is made with the addition confidence threshold first and the existence probability exceeds the addition confidence threshold, there is no to perform a second comparison with the removal confidence threshold.

The geographic database may list road objects with positions and object attributes. In the example of traffic signs, the object attributes may include a sign type (e.g., speed limit, no passing, no left turn, or other examples), and a sign value (e.g., 50 mph, 100 kph, another value, or empty). Some sign types have no value, which corresponds to a sign value of empty. Example sign types with no value include no passing, stop, and yield signs.

Figure 3:
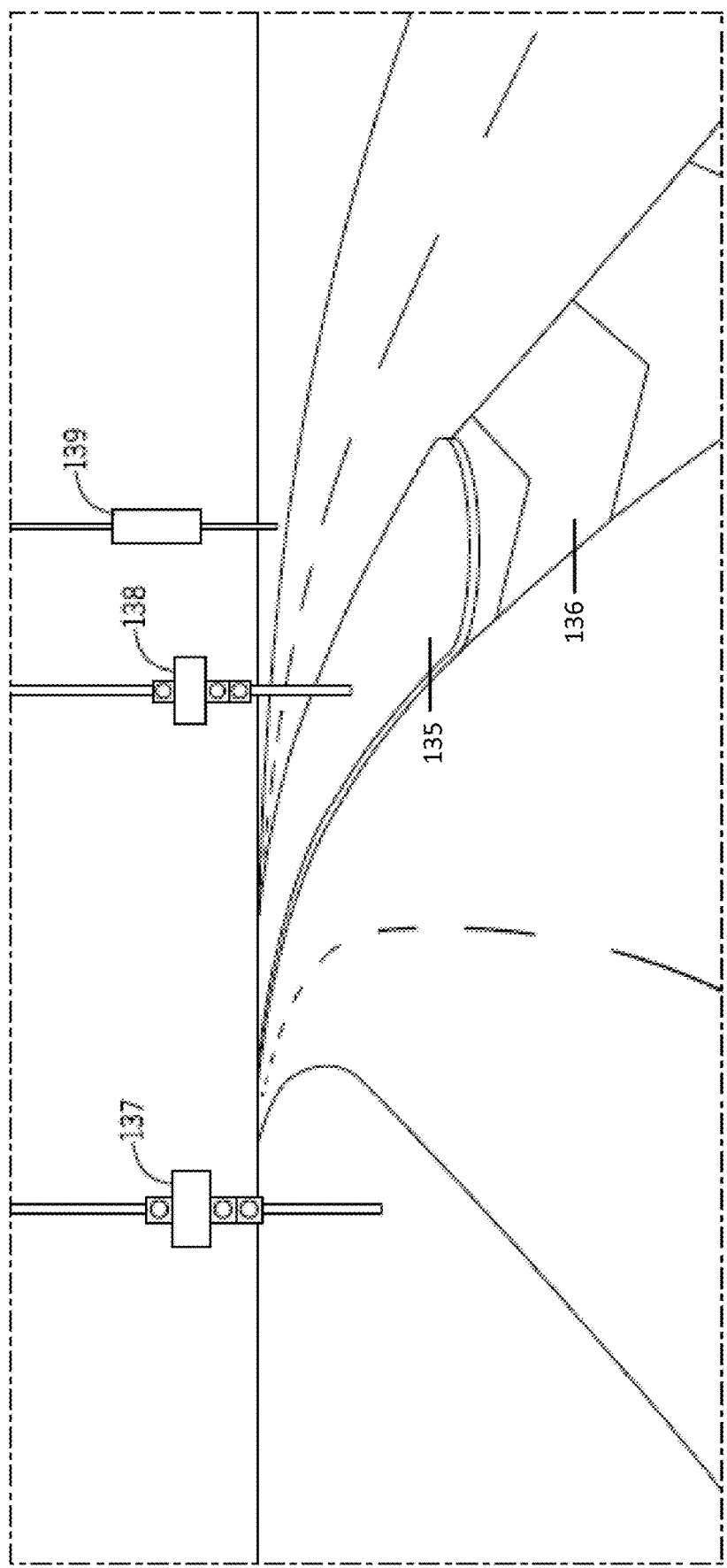
FIG. 3 illustrates example road objects.

FIG. 3 illustrates example road furniture such as traffic signs or dividers along the roadway. FIG. 3 illustrates a curb divider 135, a non-barrier divider 136, a left-hand side traffic object 137, a median traffic object 138, and a right-hand side traffic object 139. Addition or different road furniture may be included.

The road dividers may be modular dividers, permanent physical dividers, and non-barrier dividers. The road dividers may divide lanes of traffic. The divided lanes may be in the same direction of travel or different direction of travel.

Example modular dividers, which are temporary physical dividers, include a "jersey barrier" or "jersey wall." The temporary physical dividers may be mechanically coupled to one another and may be at least partially filled with sand, water, or another filler. The temporary physical dividers may be moved for construction projects, traffic rerouting, or other transient events.

Example permanent physical dividers include curb divider 135. The permanent physical divider may be constructed from concrete. A non-barrier divider 136 is not a physical divider. Example non-barrier dividers 136 may include a raised level of pavement, a median, or painted lines on the roadway.

While only dividers, traffic lights and traffic signs are shown, other road objects are possible. The traffic objects may be flow related traffic objects, intersection related traffic objects, hazard related traffic objects, informative path related traffic objects, informative point of interest (POI), and transit related traffic objects. Other road objects may include transient or semi-transient objects. Examples include hazards such as potholes, stalled vehicles, or foreign objects (e.g., blown out tires, roadkill, or fallen rock).

Flow related traffic objects include information indicative of the flow of traffic along the roadway. For example, traffic signs include indicia proportional to the maximum speed of the roadway, curve speed warnings may include indicia proportional to the maximum speed of the roadway, and traffic light statistics may indicate the traffic flow in a particular area.

Informative path related traffic objects may include marker signs that indicate the functional classification of the roadway or a particular type of roadway. Example functional classification include arterial roads, collector roads, and local roads. Intersection related traffic objects may include objects that indicate the existence of an intersection. Examples include street signs, stop signs and traffic lights. In additional, traversing utility cables, which are substantially perpendicular to the direction of travel may be indicative of an intersection.

Hazard related traffic objects may include stalled vehicles, emergency vehicles, and road obstacles. The road obstacles may include any foreign object in the roadway. Informative point of interest (POI) related objects may include signs that describe a particular location or POI. Transit related traffic objects may be related to other forms of transportation. Example transit related objects include pedestrian crosswalks, pedestrian signs, bus stops, transit stops, trolley stops, or subway stops.

Figure 4:
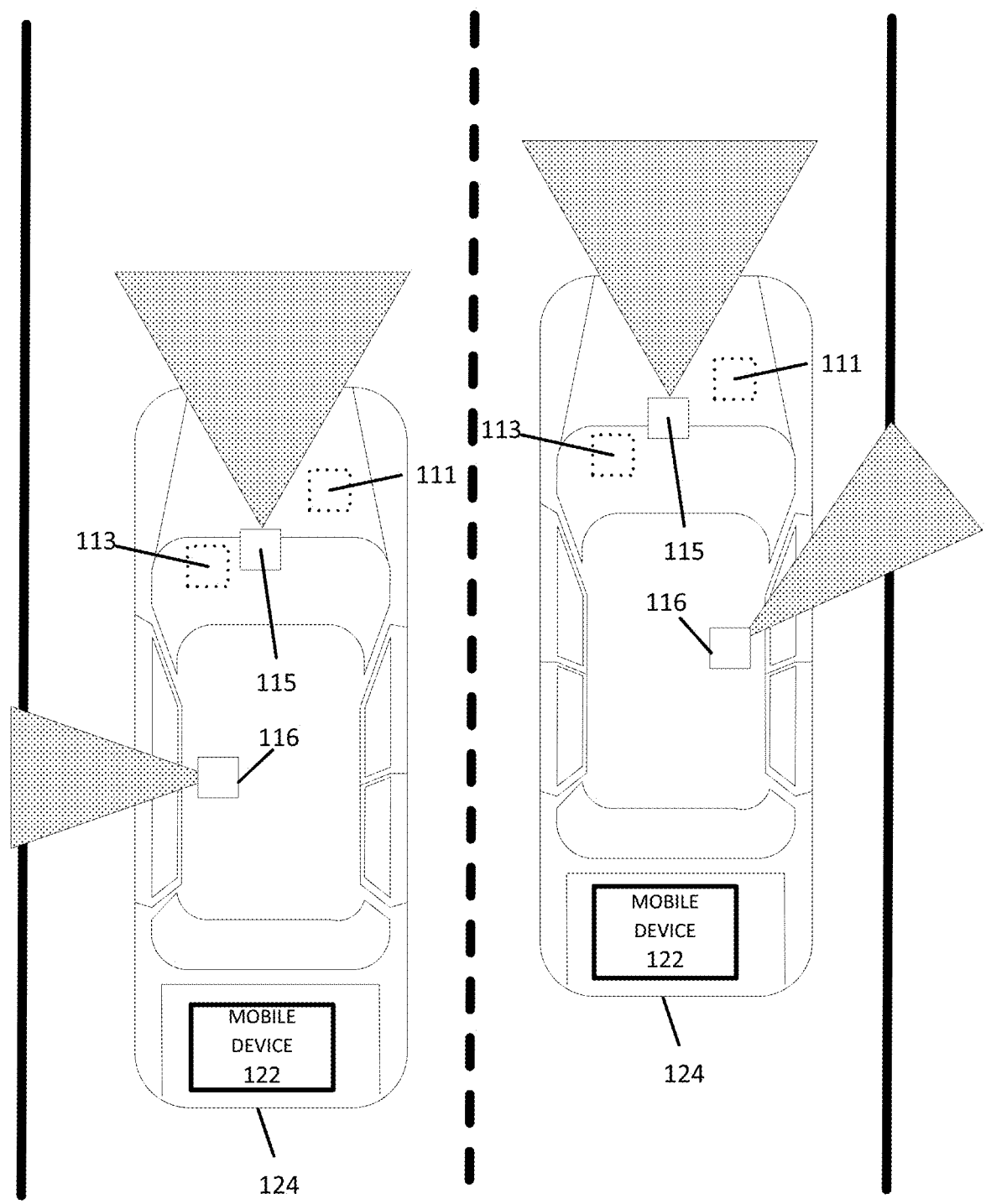
FIG. 4 illustrates example fleet vehicles.

FIG. 4 illustrates two example vehicles 124 in a fleet of vehicles and various arrangements of example sensors for the probes. A first sensor 115 may be mounted on the vehicle 124 to provide a forward looking view. The first sensor 115 may collect data at a wide angle to survey the full view of the upcoming roadway. A second sensor 116 may be mounted on the vehicle to provide an alternate view from the vehicle 124. In one example, the second sensor 116 may be to the lateral side of the vehicle, which may be a closer range for collecting data of traffic signs. The alternate view and the forward looking view may be at an angle (e.g., 45 degrees or 90 degrees) to one another.

Data from the first sensor 115 may be combined with data from the second sensor 116 in order to provide a more complete representation of the collected road object. In one example, one of the sensors is a distancing system (e.g., LIDAR, SONAR, RADAR) and the other of the sensors is an imaging system (e.g., camera). The data from the distance system is matched with a shape of a three dimensional template to determine a type of road object (e.g., traffic sign). The data from the imaging system is matched with the words or shapes in a two dimensional templates for the type of road object.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor. In addition to directly matching templates, data collected from the engine sensor 111 or the vehicle sensor 113 may be used to identify the road feature. For example, when the vehicle 124 brakes, the templates may be reduced to braking related templates such as stop signs, traffic lights, or crosswalks. In another example, when the vehicle 124 turns, the templates may be reduced to turning related templates such as road obstacles, exits lanes, or curve signs. Other examples are possible.

Figure 5:
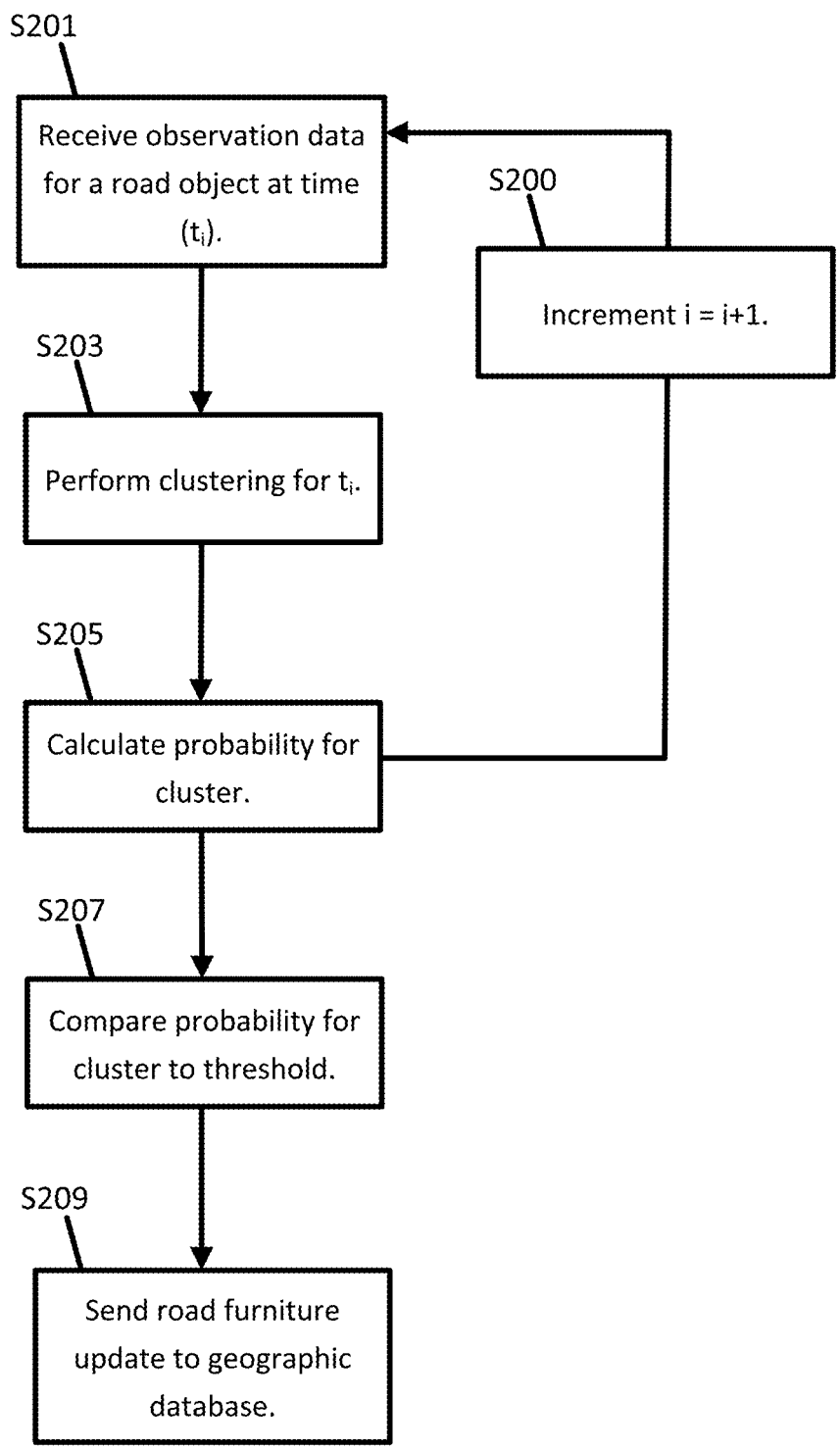
FIG. 5 illustrates an example flowchart for clustering data over time and position for road object probabilities.

FIG. 5 illustrates an example flowchart for clustering data over time and position for road object probabilities. The acts of the flowchart may be performed by mobile device 122, server 125, or a combination thereof. Additional, different, or fewer acts may be included.

The observation data may be analyzed (e.g., according to FIG. 2) according to a predetermined time interval. The time interval may be hourly, daily, weekly, or another interview. All of the observation data collected during the time interval is analyzed at the same time at the end of the interval (e.g., at the end of the day, week, etc.). For each time interval, the number of vehicles which observed the road object, $n_{p,i}$, which may be referred to as positive observations are determined, and the total number of vehicle that passed by the road object $N_i = n_{p,i} + n_{n,i}$, where $n_{n,i}$ is the number of negative observations, is also determined.

The process includes an iterative loop at act S200. The value i is incremented (i=I+1). Values from the current iteration are notated with i and values from the previous iteration are notated with i−1. When the time interval is daily, the value i corresponds to different days (e.g., day 1, day 2, etc.). The total number of vehicles that passed by the location is updated: $N = N_{i-1} + N_i$. The total number of positive observations is updated: $n_p = n_{p,i-1} + n_{p,i}$.

At act S201, the mobile device 122 or the server 125 receive observation data for a road object at the current interval for time $t_i$. The data observations may be collected at various locations at grouped according to location. The data observations may be incremented according to road segment.

At act S203, the mobile device 122 or the server 125 perform clustering for $t_i$. A cluster center ($C_i$) may be calculated as the average position of observations within the cluster. The cluster center is stored and used in the subsequent iteration. Uncertainty on the cluster center, calculated as standard error on $C_i$ is $\sigma_i = SD_i / \sqrt{n_{p,i}}$ where $SD_i$ is the standard deviation of the positions of the $n_{p,i}$ observations.

The mobile device 122 or the server 125 may compare the observation data from a current interval (i) to another interval such as the immediately previous interval (e.g., i−1). The observation data includes a first cluster of observation data for a first time interval and a second cluster of observation data for a second time interval. The mobile device 122 or the server 125 may compare the first cluster and the second cluster according to a test statistic described by Equation 4:

$$\frac{|C_1 - C_2|}{\sqrt{\sigma_1^2 + \sigma_2^2}} < T_0 \qquad \text{Eq. 4}$$

where $C_1$ is a center of the first cluster of observation data, $C_2$ is a center of the second cluster of observation data, $\sigma_1$ is a standard deviation of the first cluster, $\sigma_2$ is a standard deviation of the second cluster, and a matching threshold is $T_0$. Using equation 4, the mobile device 122 or the server 125 performs a center comparison of centers of the first cluster and the second cluster, performs a distribution comparison of data distribution of the first cluster and the second cluster, and matches the first cluster and the second cluster based on the center comparison and the distribution comparison.

Alternatively or in addition to the test statistic clustering may be based on type, location, and/or position. Two clusters are matched if the clusters are the same or within a predetermined range in type. Two clusters match in type if the describe the same road object (i.e., the two clusters describe the same road sign, road divider, or other object). Two clusters are matched if they are positioned similarly with respect to the road. The position with respect to the road may be the same side of the road (left, right or overhead) or distance (e.g. less than 25-50 meters apart) and heading (e.g. less than 30 degrees).

In one example, the clusters calculated today (day i) are compared with the road objects from the previous day's map (day i–1) using a matching prescription such as type, location, position or the test statistic of Equation 4. If the matching prescription is less than a clustering threshold, the cluster from today and yesterday are considered matches and included in the same cluster. Data in the same cluster is analyzed together for determined the existence probability and deciding whether road objects should be added or removed from the geographic database.

Using the test statistic, the clustering threshold $T_0$ may be selected according to a variety of factors. The clustering threshold may be based on geographic region. The clustering threshold may be based on road density. For example, urban areas with more roads per unit area may require a higher clustering threshold before data is clustered together and rural areas with fewer roads per unit area may use a lower clustering threshold. The cluster threshold for a particular road may be based on the type of road. For example, the clustering threshold may be based on functional classification, road width, or a number of lanes.

The value of the clustering threshold may be selected as a value of order 2-3 (meaning that the cluster centers are consistent with the hypothesis that they both come from the same true sign, at 2-3 sigma level). The threshold can be tuned as needed based on data analysis.

At act S205, the mobile device 122 or the server 125 may calculate probability for the cluster, which may be two clusters of data from different time intervals combined. The calculation may include the process described by FIG. 2, which includes the initial value is defined as a predetermined constant before the predetermined interval in Equation 3 and defined as the initial value is defined as the updated value for a subsequent iteration in Equation 3'.

The mobile device 122 or the server 125 may calculated the updated value, after the time interval, for the probability that the matched cluster corresponds to an existing sign, given $n_{p,i}$ positive observations out of $N_i$ passing cars, in Equation 3' modified the successive time intervals:

$$P(\exists \mid N_i, n_{p,i}) = \frac{P(N_i, n_{p,i} \mid \exists) P(\exists \mid N_{i-1}, n_{p,i-1})}{P(N_i, n_{p,i} \mid \exists) P(\exists \mid N_{i-1}, n_{p,i-1}) + P(N_i, n_{p,i} \mid \nexists) P(\nexists \mid N_{i-1}, n_{p,i-1})} \qquad \text{Eq. 3'}$$

where $\exists$ means "existing sign", $P(\exists|N_{i-1},n_{p,i-1})$ is the prior probability that the sign exists, calculated the previous day, i–1, and $P(\nexists|N_{i-1},n_{p,i-1})=1-P(\exists|N_{i-1},n_{p,i-1})$ is the prior probability that the sign does not exist, calculated previous day. For clustered discovered today which do not match any signs from yesterday's map, calculate sign existence probability using the generic priors used on slide 3: $P(\exists)$=the prior probability that the sign exists and $P(\nexists)$=1–$P(\exists)$=the prior probability that the sign does not exist. For clusters that exist in yesterday's map but not in today's data ($n_{p,i}$=0), count the total number of vehicles that passed by the sign, $N_i$=$n_{n,i}$ (which are all negative observation, if any) and calculate the updated probability that the sign exists using $n_{p,i}$=0

At act S207, the mobile device 122 or the server 125 is configured to compare the updated value for the existence probability to a confidence threshold. The confidence threshold may be a high threshold or a low threshold. The high threshold may be selected when a majority of the observations in the observation data indicate that the road object is present, and the low threshold may be selected with a majority of the observations in the observation data indicate that the road object is absent.

At act S209, the mobile device 122 or the server 125 an update is sent to the geographic database. Probabilities above the high threshold signify that the road object should be added to the geographic database, and probabilities below the low threshold signify that the road object should be removed from the geographic database.

Figure 6:
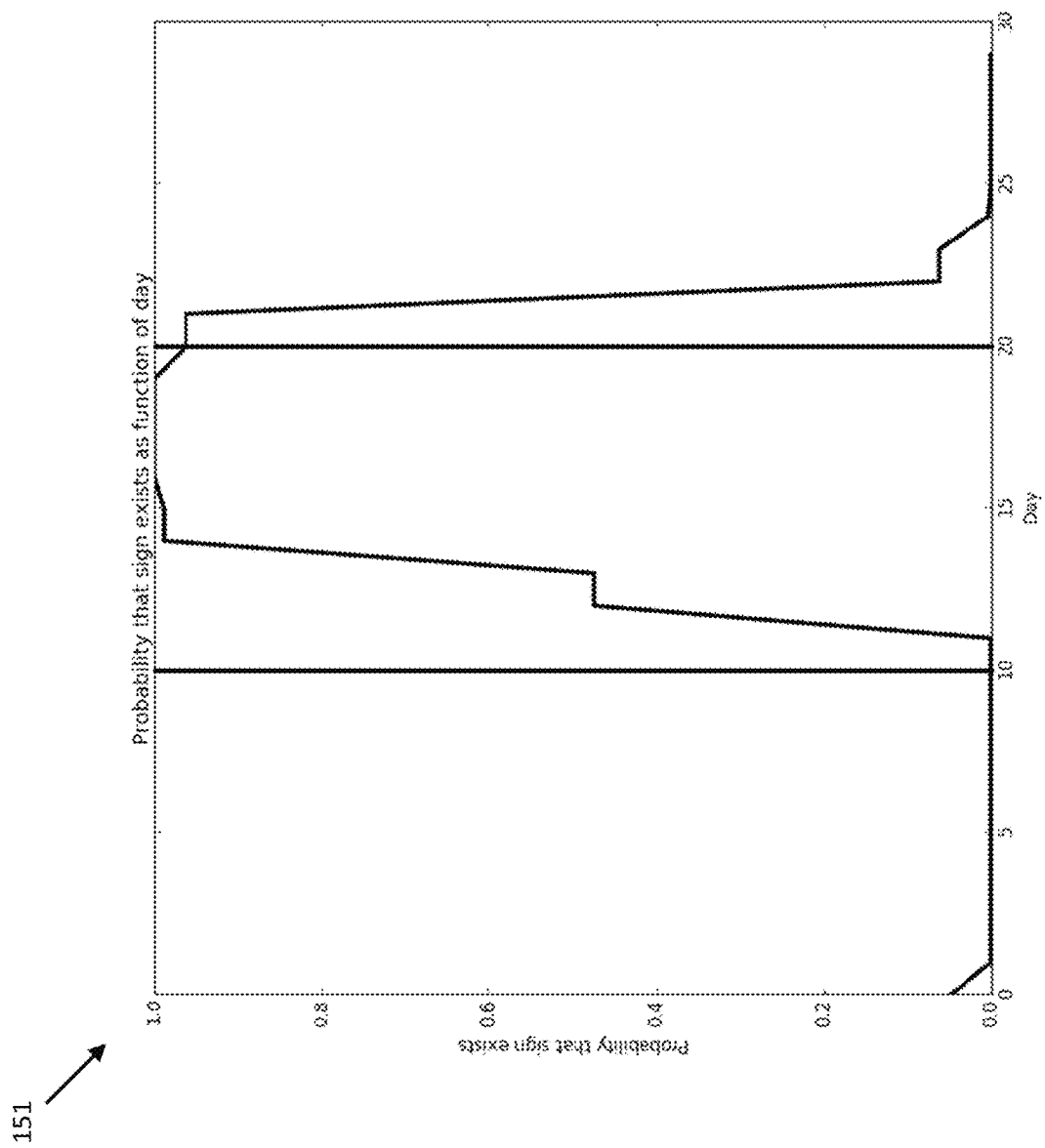
FIG. 6 illustrates a time plot for the probability of a sign.
Figures 7A, 7B:
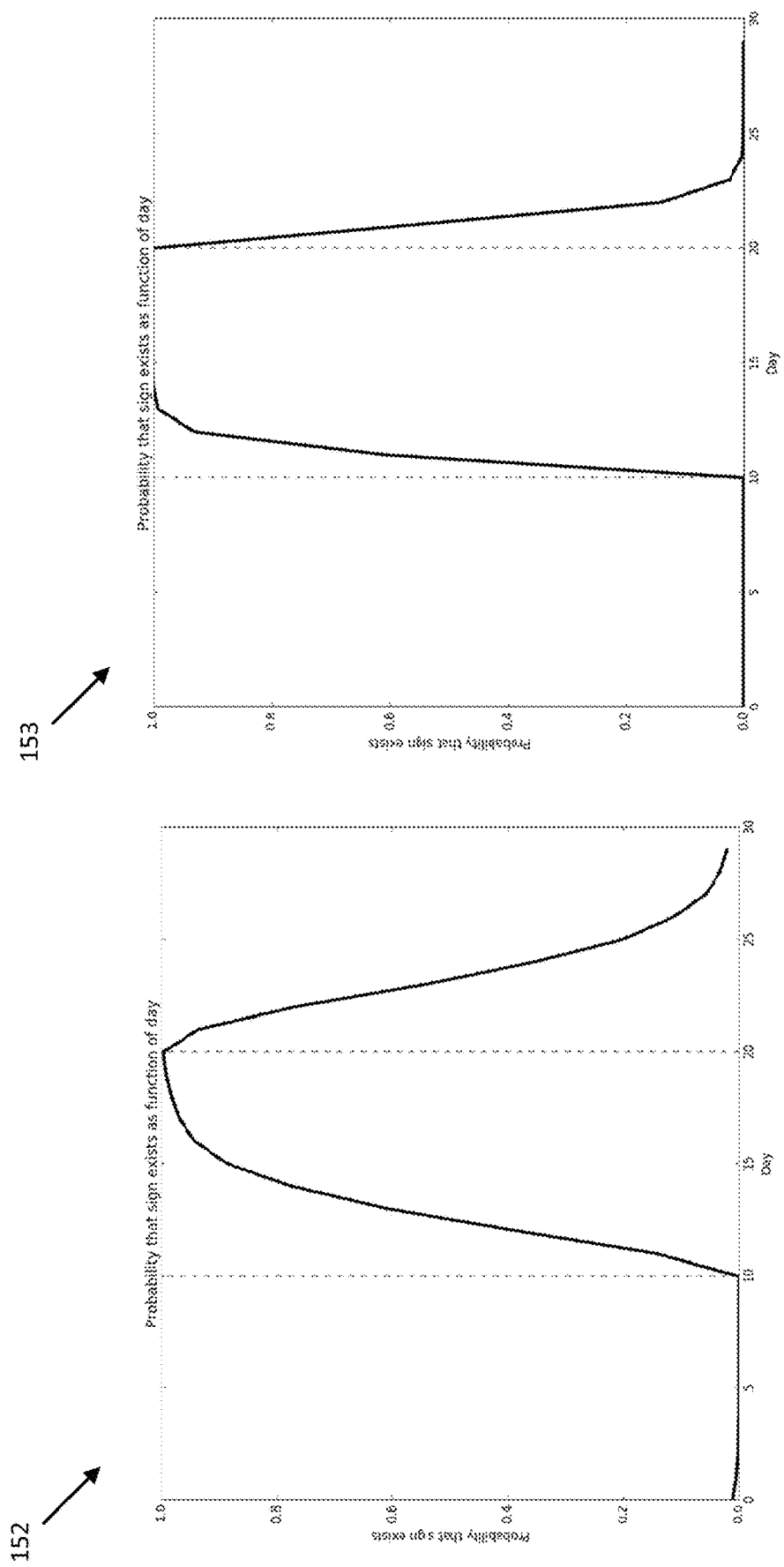
FIGS. 7A and 7B illustrate time plots for the probability of a sign at different time intervals.

FIGS. 6, 7A, and 7B illustrate time plots for the probability of a sign using the techniques described herein for determining the probability sign exists. The vertical axis illustrates the probability that the sign exists and the horizontal axis illustrates the time interval, which in this example are measured daily.

FIG. 6 illustrates plot 151 for an example in which, on average, one vehicle drives on a road every day. The actual number of vehicles passing every day according to a statistical distribution. The example statistical distribution illustrated is a Poisson distribution with mean=1. The example runs for 30 days. On day 10, a traffic sign is added, as shown by the first vertical line, and on day 20 the traffic sign is removed, as shown by the second vertical line. Other distributions may include a normal distribution, a constant density distribution, a degenerate distribution, a Skellam distribution, a Beta distribution, continuous uniform distribution, a chi-squared distribution, or a gamma distribution.

The observations are characterized by f=0.01 and $\epsilon$=0.95. The probability that the sign exists, as function of the day of the experiment, is shown in the plot 151. Consider a high threshold of 0.9 and a low threshold of 0.1. Although the sign was placed on day 10, only on day 14, the 90% probability the sign exists. Although the sign was removed on day 20, only on day 22 does the plot 151 reach a 10% chance that the sign exists.

FIG. 7A illustrates the example of FIG. 6 with a plot 152 that is the average of over 1000 trials using the same statistical distribution. The sign existence is determined with 90% probability after about 5 days, in average the sign removal is determined at 90% probability (10% existence) after about 6 days. Of course this example assumes only one vehicles passing by the sign every day (in average), the sign observation efficiency is only 95%, and the false positive rate is 1%. Application in the field would involve many more vehicles passing per day and data collection techniques may result in improvements in both the observation efficient and the false positive rates. For example, plot 153 illustrates a quick response when the average number of vehicles per day is increased to 3, as illustrated in FIG. 7B. The learning speed also depends on sign recognition efficiency $\epsilon$ and the false positive rate f. The larger $\epsilon$ and the smaller f, the faster responsive time for the geographic updates.

FIGS. 8, 9, 10A, and 10B illustrate time plots for the probability of a physical divider using the techniques described herein for determining the probability sign exists.

Figure 8:
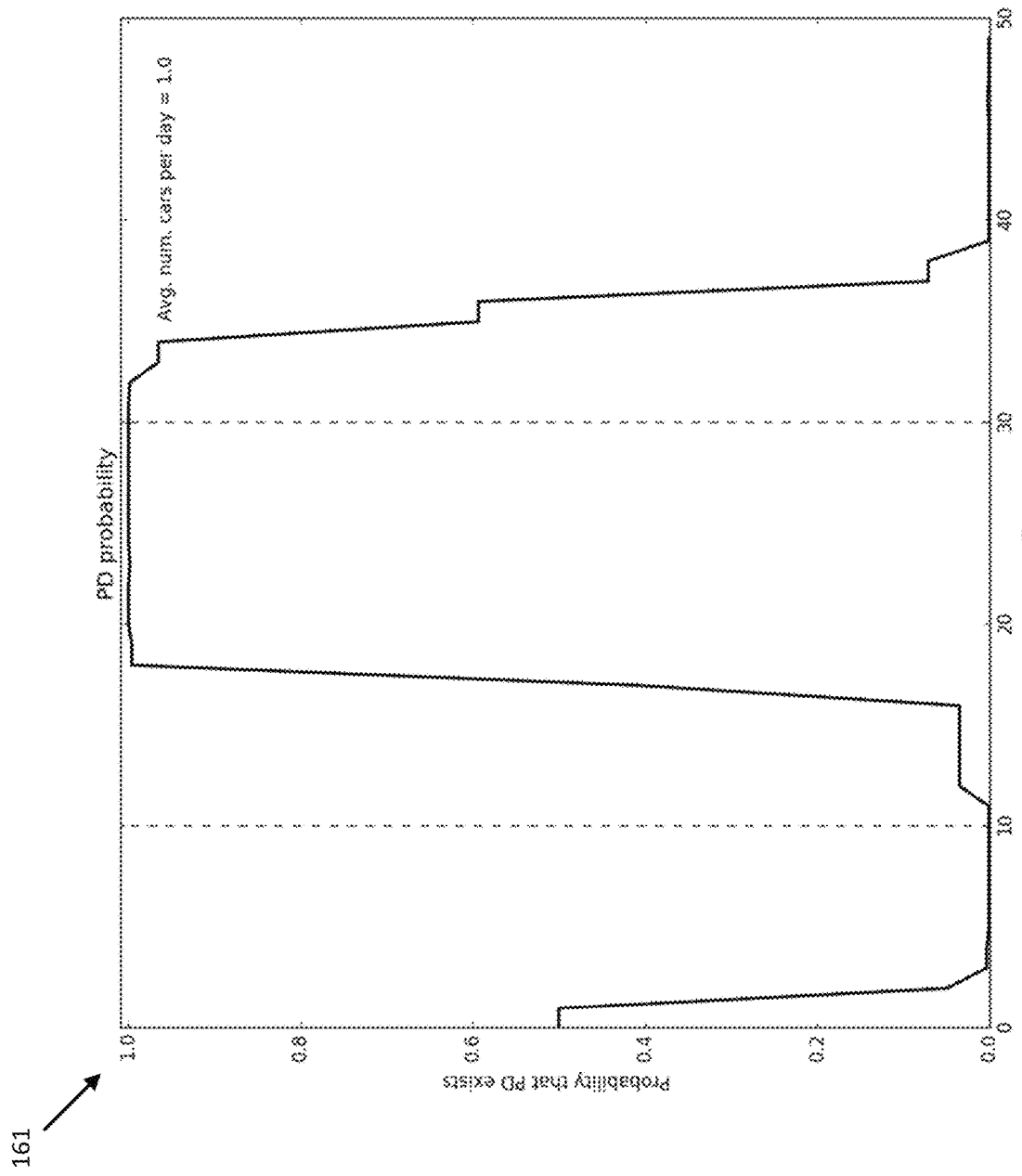
FIG. 8 illustrates a time plot for the probability of a physical divider.

FIG. 8 illustrates a time plot 161 for the probability that a physical divider exists. In this example, on average, one vehicle drives on a road every day. The actual number of vehicles passing every day according to a statistical distribution. The example statistical distribution illustrated is a Poisson distribution with mean=1. The example runs for 50 days. On day 10, a physical divider is added, as shown by the first vertical line, and on day 30 the physical divider is removed, as shown by the second vertical line.

The observations are characterized by f=0.05 and $\epsilon$=0.95. The probability that the sign exists, as function of the day of the experiment, is shown in the plot 161. Consider a high threshold of 0.95 and a low threshold of 0.05. Because the initial value is 0.5, the plot 161 starts from 0.5 and drops to zero quickly as negative observations accumulate. Although the physical divider was placed on day 10, it takes a few days to reach 95% probability that the physical divider exists. Although the physical divider was removed on day 30, it takes few days to reach 5% chance that the physical divider exists.

Figure 9:
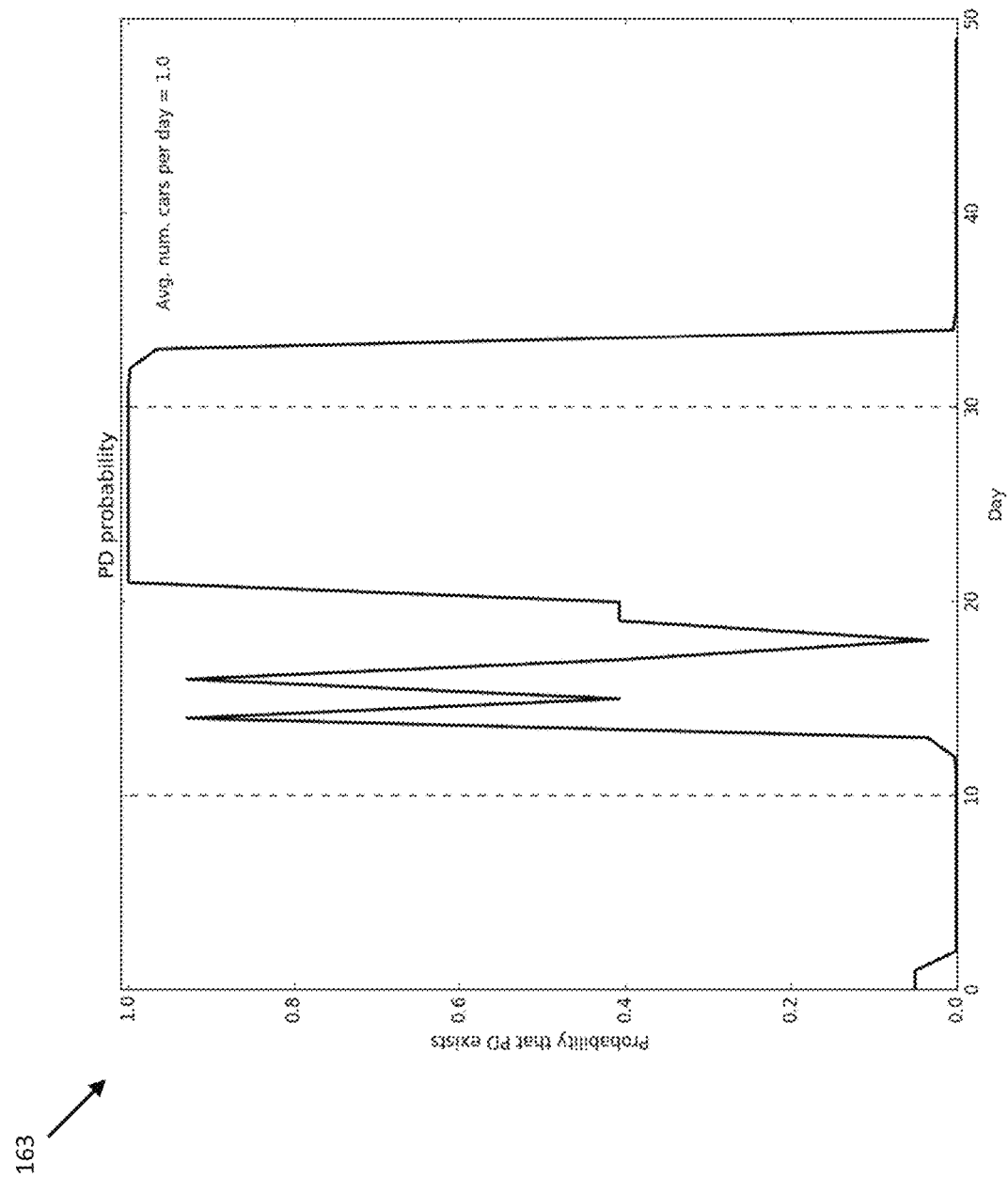
FIG. 9 illustrates another time plot for the probability of a physical divider.

FIG. 9 illustrates a time plot 163 for a subsequent day. The plot 163 starts below 0.5 because there were prior observations on a previous date used for the initial value set. Due to random anomalies in the data observations, some extreme random fluctuation occur around day 15, but the newly placed physical divider is detected above the confidence interval around day 20.

Figure 10B:
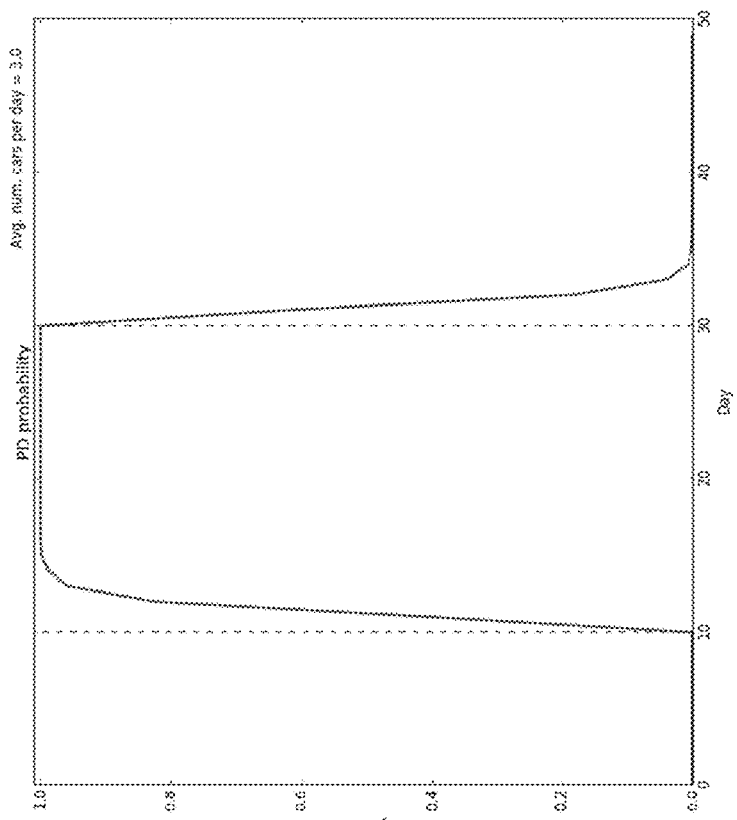
FIGS. 10A and 10B illustrate time plots for the probability of a physical divider at different time intervals.
Figure 10A:
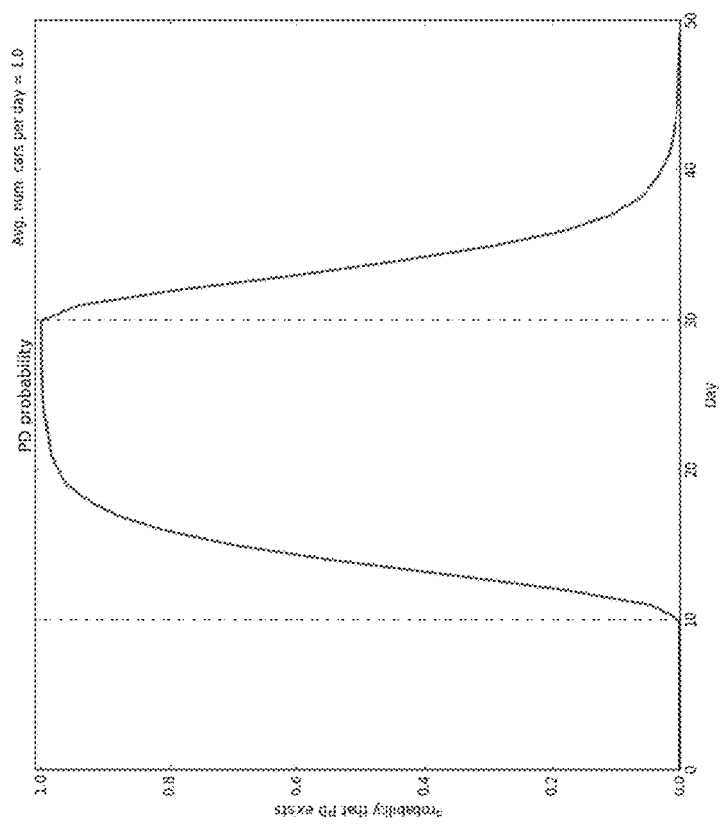

FIG. 10A illustrates the example of FIG. 8 with a plot 165 that is the average of over 1000 trials using the same statistical distribution. The average approaches a modest delay time between the addition of the physical divider, or removal of the physical divider, and the update to the geographic database. FIG. 10B illustrates an increased frequency of vehicles using plot 167, which further decreases the response time between real world changes and map database updates.

Figure 11:
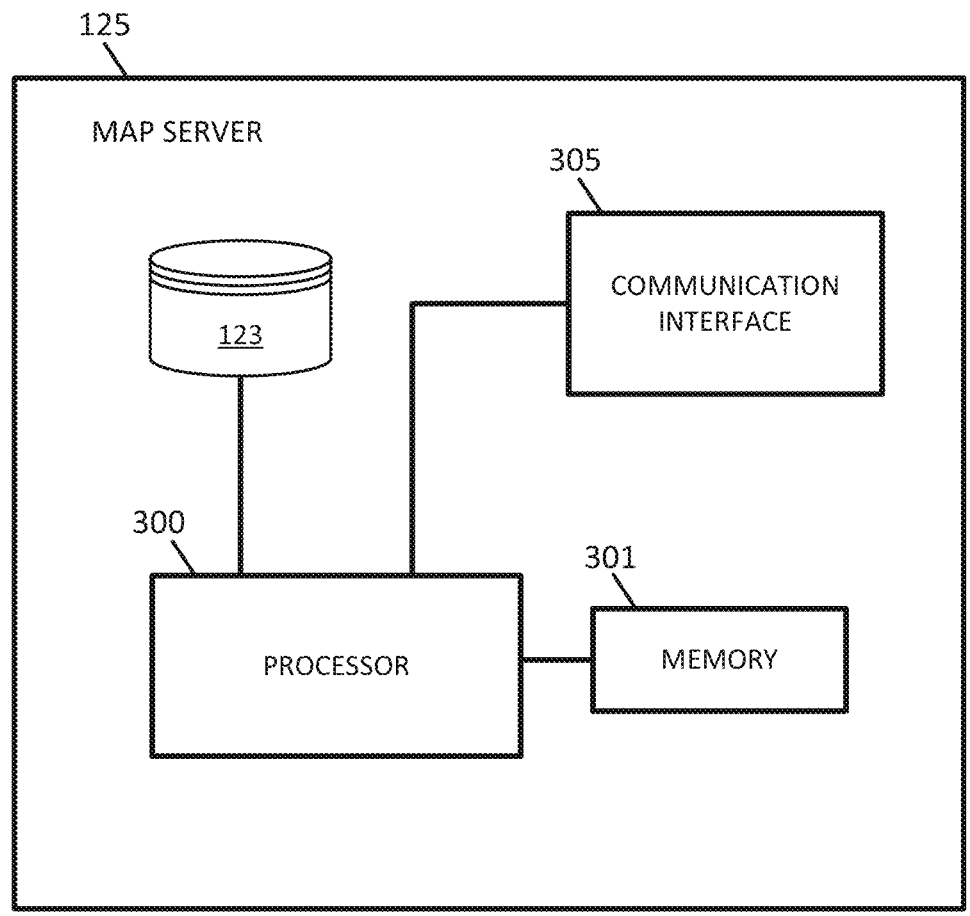
FIG. 11 illustrates an example server.
Figure 12:
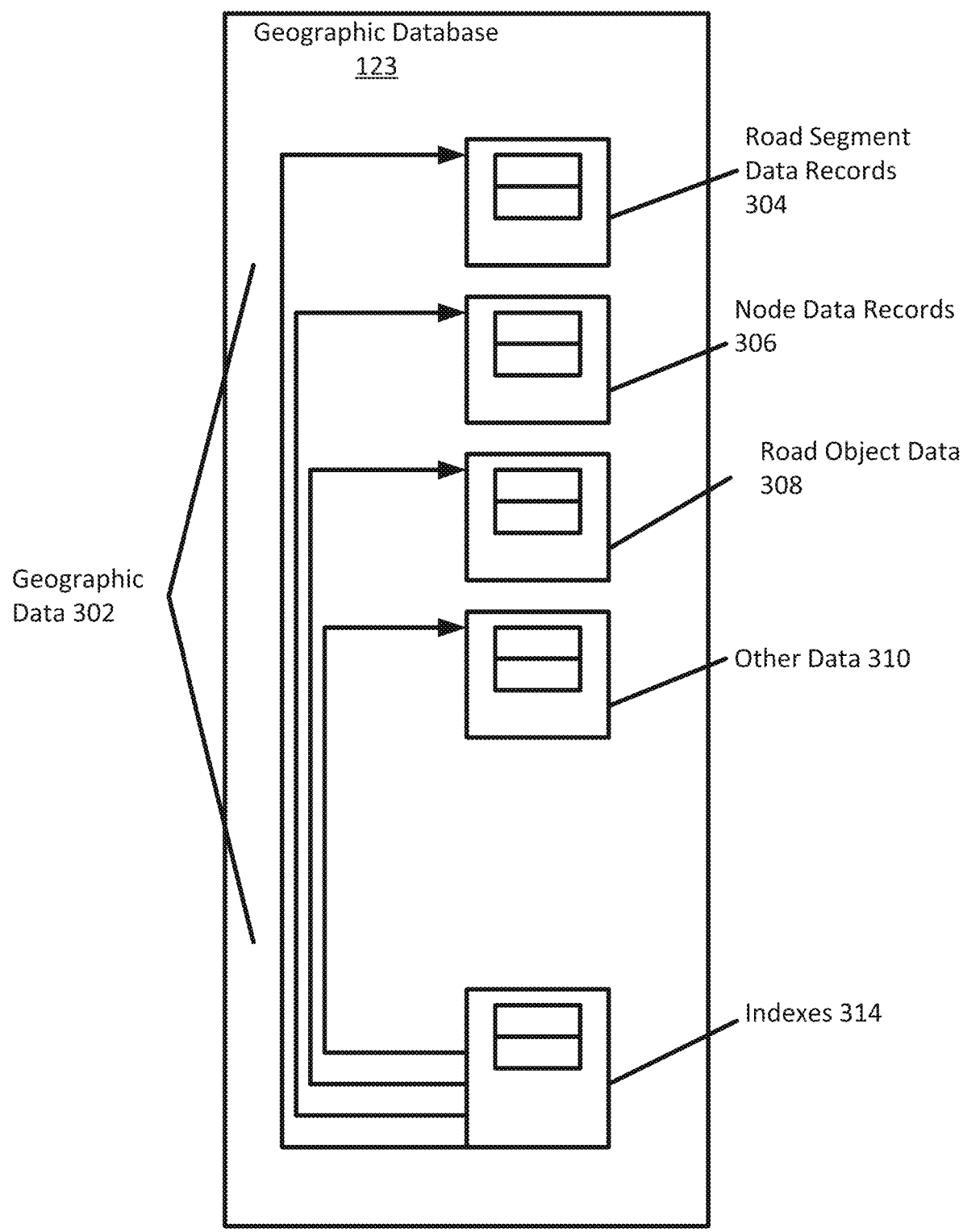
FIG. 12 illustrates an example geographic database.

FIG. 11 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Example settings include the update interval for distributing updates to the fleet of vehicles and the confidence thresholds (low threshold, high threshold, clustering threshold) for determining road features. The database 143 may include the server map or remote map. Additional, different, or fewer components may be provided in the server 125. FIG. 12 illustrates an example flowchart for the operation of server 125. Additional, different, or fewer acts may be provided.

The geographic database 123 includes road segments, and at least one road segment associated with at least one road object attribute. The road object attribute may describe the type of road object (e.g., physical divider, traffic sign, or another object). The road object attribute may describe a relative location of the road object (e.g., left side, right side, above the road). The road object attribute may include an angle from the direction of travel to the road object. The road object attribute may include a distance between the road segment and the road object.

The memory 301 is configured to store received observation data. The memory 301 is configured to store data temporary from the database 123. Portions of the database 123 are loaded into memory 301 for comparison with the road observations. The memory 301 also stores values from one iteration of the algorithm to the next such as the initial value set for an existence probability that a road object exists.

The communication interface 305 is configured to receive observation data from sensors of a plurality of vehicles having a total quantity. The first quantity of the plurality of vehicles observed a presence of the road object and a second quantity of the plurality of vehicles observed an absence of the road object.

The processor 300 is configured to a presence probability indicative of a likelihood that observation data from the first quantity of the plurality of vehicles accurately describe the road object, an absence probability indicative of a likelihood that observation data from the second quantity of the plurality vehicles accurately describe the road object, and an updated value for the existence probability that the road object exists based on the initial value set, the presence probability, and the absence probability. The geographic database 123 is updated in response to a comparison of the updated value for the existence probability to at least one threshold confidence level. The threshold confidence level includes a removal confidence threshold, and the processor 300 is configured to remove the road object from the geographic database when the comparison of the updated value for the existence probability is less than the removal confidence threshold. The threshold confidence level includes an addition confidence threshold, and the processor 300 is configured to add the road object to the geographic database when the comparison of the updated value for the existence probability is greater than the addition confidence threshold.

In FIG. 12, the geographic database 123 may contain at least one road segment database record 304 (also referred to as "entity" or "entry") for each road segment in a particular geographic region. Any of the features of geographic database 123 may be applied to local databases 133. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate road object data 308 (road object attributes) with a road segment in the segment data records 304 or a geographic coordinate. An index 314 may, for example, store data relating to one or more locations for the road object attribute 308 for each location. The road object attribute 308 may describe the type of road object, the relative location of the road object, an angle from the direction of travel to the road object, and/or a distance between the road segment and the road object.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 relevant for this invention are: temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 13:
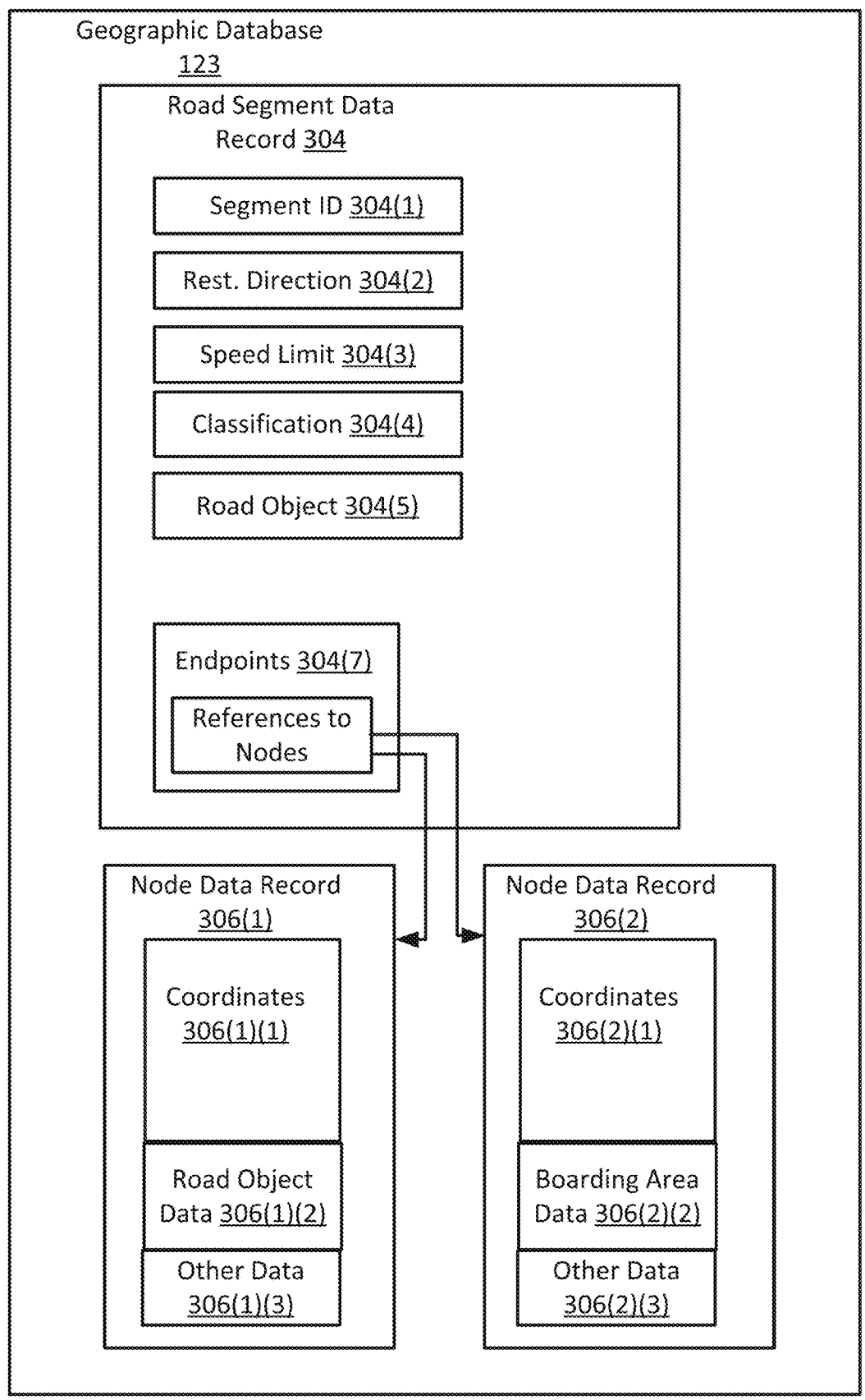
FIG. 13 illustrates an example geographic database.

FIG. 13 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 13 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and road object data 306(1)(2) and 306(2)(2). The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

Figure 14:
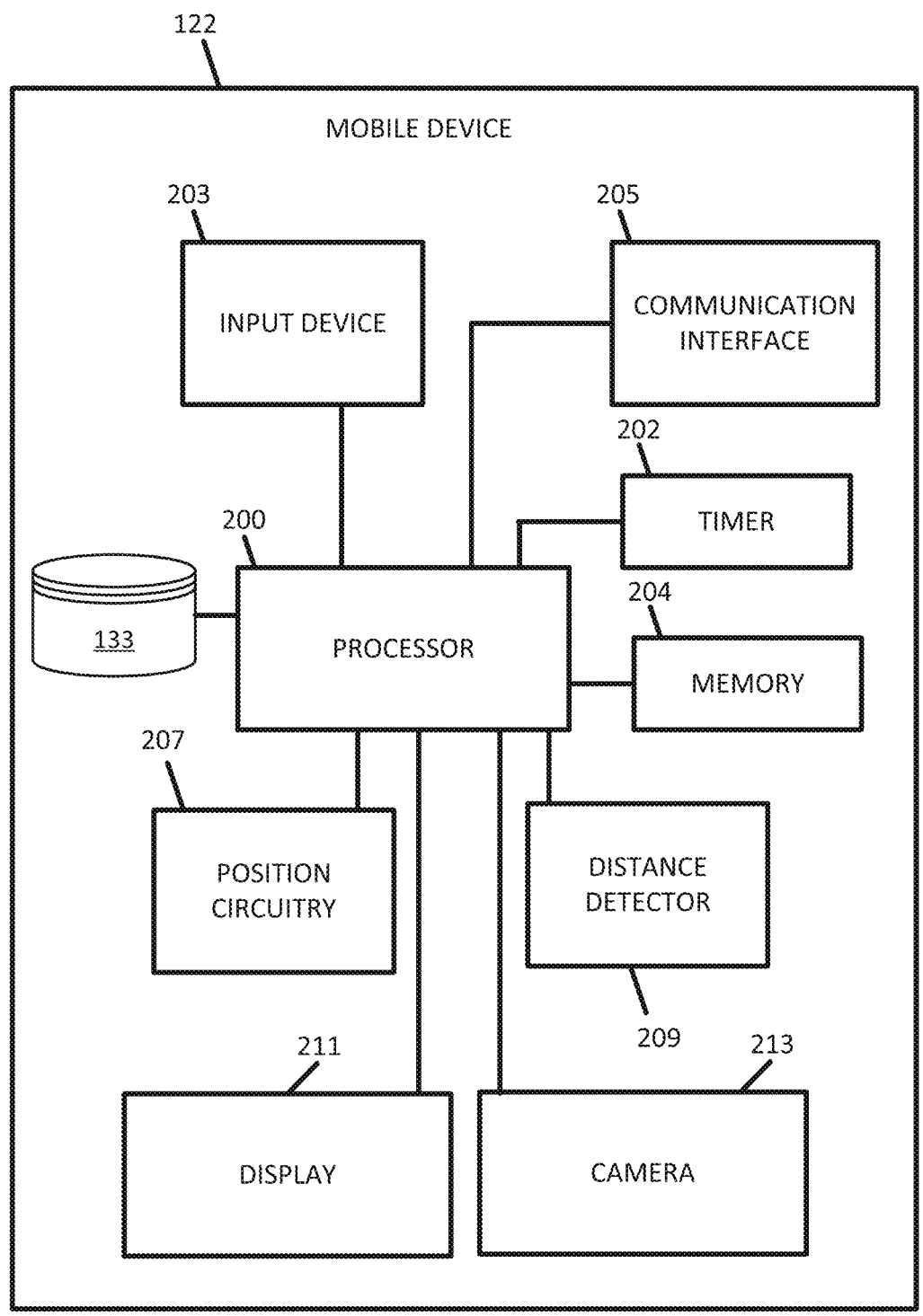
FIG. 14 illustrates an example mobile device.

The geographic database 123 and the data stored within the geographic database 123 may be licensed or delivered on-demand. Other navigational services or traffic server providers may access the location fingerprint data, traffic data and/or the predicted parking availability data stored in the geographic database 123. Data including the FIG. 14 illustrates an exemplary mobile device 122 of the system of FIG. 1.

The mobile device 122 includes a processor 200, a vehicle database 133, a timer 202, a memory 204, an input device 203, a communication interface 205, position circuitry 207, a distance detector 209, a display 211, and a camera 213. Additional, different, or fewer components are possible for the mobile device 122.

The distance detector 209 is configured to receive sensor data indicative of a road object such as a road sign or a traffic light. The distance detector 209 may emit a signal and detect a return signal. The signal may be a laser signal, a radio signal, or a sound signal. The distance detector 209 may determine a vector (distance and heading) from the position of the mobile device 122 to the position of the road object. The camera 213 is also configured to receive sensor indicative of the road object. Images collected by the camera 213 may be analyzed to determine the distance to the road object. In one example, the number of pixels or relative size of the road object indicates the distance. Smaller objects are farther away. In another example, the relative differences between two or more images indicates the distance. For example, when two successive images are collected at a specific distance apart, the relative changes in the road object indicates the distance to the road object.

The position detector or position circuitry 207 is configured to determine a geographic position associated with the road object. The geographic position may be directly determined from the physical location of the road object or may be determined based on a position of the vehicle when collecting the sensor data for the road object. The geographic position may be map matched to the vehicle map in the database 133. The geographic position may be determined from the absolute position detected by position circuitry 207 summed with the vector for the road object. Map matching is a technique for assigning the data point to a digital map such as the vehicle map.

The processor 200 may calculate the existence probability. Alternatively, the communication interface 205 may send the observation data, which is aggregated with observation data from other mobile devices 122 at a controller configured to select the sensor data indicative of the road object and the geographic position associated with the road object, wherein observation data from a plurality of vehicles including the sensor data and the geographic position are analyzed to calculate a presence probability indicative of a likelihood that observation data from a first quantity vehicles accurately describe the road object, an absence probability indicative of a likelihood that observation data from the second quantity of the plurality vehicles accurately describe the road object, and an updated value for an existence probability that the road object exists based the presence probability, and the absence probability.

The timer 202 is configured to determine when a predetermined time has elapsed since the sensor data was received. The timer may be a standalone integrated circuit. The timer may be performed by the processor 200. The timer 202 may compare the time that has elapsed since the sensor data was received to an update schedule (e.g., determine whether to report the observation data to server 125 or another central controller). In another example, the processor 200 may calculate the existence probability in response to the timer. When the predetermined time has elapsed, the processor 200 performs another iteration of the calculations above described in Equations 1-3.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the vehicle database 133 including the road object attribute.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the vehicle database 133 including the road object attribute.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the traffic estimation level of a current or upcoming road link based on the vehicle database 133 including the road object attribute.

The mobile device 122 may generate a routing instruction based on the vehicle database 133. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123, 133, 143, and 163 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment to streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for updating a geographic database, the method comprising:

determining an initial value set for an existence probability that a road object exists;

receiving observation data based on sensors of a plurality of vehicles, wherein a first quantity of the plurality of vehicles observed a presence of the road object and a second quantity of the plurality of vehicles observed an absence of the road object;

calculating, using a processor, a presence probability based on the first quantity of the plurality of vehicles, the presence probability indicative of a likelihood that observation data from the first quantity of the plurality of vehicles accurately describe the road object;

calculating, using the processor, an absence probability based on the second quantity of the plurality of vehicles, the absence probability indicative of a likelihood that observation data from the second quantity of the plurality vehicles accurately describe the absence of the road object;

calculating, using the processor, an updated value for the existence probability that the road object exists based on the initial value set, the presence probability, and the absence probability;

performing, using the processor, a comparison of the updated value for the existence probability to a threshold confidence level; and updating the geographic database as a function of the comparison of the updated value for the existence probability to the threshold confidence level.

Embodiment 2

The method according to embodiment 1, wherein the road object includes a traffic sign or a road divider.

Embodiment 3

The method of any of the preceding embodiments 1 to 2, wherein the updated value is calculated at a predetermined interval.

Embodiment 4

The method of any of the preceding embodiments 1 to 3, wherein the initial value is defined as a predetermined constant before the predetermined interval and defined as the initial value is defined as the updated value for a subsequent iteration.

Embodiment 5

The method of any of the preceding embodiments 1 to 4, wherein the presence probability $P(N, n_p|\exists)$ is calculated from $$P(N, n_p | \exists) = \binom{N}{n_p} \epsilon^{n_p}(1-\epsilon)^{N-n_p},$$

where N is a total quantity for the plurality of vehicles, $n_p$ is a number of positive observations, and $\epsilon$ is an observation efficiency.

Embodiment 6

The method of any of the preceding embodiments 1 to 5, wherein the observation efficiency $\epsilon$ is defined according to $$\epsilon = \frac{\text{number of vehicles that observed road object}}{\text{total number of vehicles that passed by}},$$

Embodiment 7

The method of any of the preceding embodiments 1 to 6, wherein the absence probability, $P(N, n_p|\nexists)$, is calculated from $$P(N, n_p | \nexists) = \binom{N}{n_p} f^{n_p}(1-f)^{N-n_p},$$

where N is a total quantity for the plurality of vehicles, $n_p$ is a number of positive observations, and f is a false positive rate.

Embodiment 8

The method of any of the preceding embodiments 1 to 7, wherein the false positive rate f is defined according to $$f = \frac{\text{number of vehicles that observed false positives for the road object}}{\text{total number of vehicles that passed by}},$$

Embodiment 9

The method of any of the preceding embodiments 1 to 8, wherein the updated value for the existence probability, $P(\exists|N_i, n_{p,i})$, that the road object exists is calculated from $$P(\exists | N_i, n_{p,i}) = \frac{P(N_i, n_{p,i} | \exists)P(\exists)}{P(N_i, n_{p,i} | \exists)P(\exists) + P(N_i, n_{p,i} | \nexists)P(\nexists)}$$

where the initial value includes $P(\exists)$ as a prior probability that the road object is present and $P(\nexists)$ as a prior a probability that the road object is absent, where $N_i$ is a total quantity for the plurality of vehicles at an ith iteration, and $n_{p,i}$ is a number of positive observations at the ith iteration.

Embodiment 10

The method of any of the preceding embodiments 1 to 9, wherein the initial value set is defined according to ground truth data.

Embodiment 11

The method of any of the preceding embodiments 1 to 10, wherein the observation data includes a first cluster of observation data for a first time interval and a second cluster of observation data for a second time interval, the method comprising:

performing a center comparison of centers of the first cluster and the second cluster;

performing a distribution comparison of data distribution of the first cluster and the second cluster; and matching the first cluster and the second cluster based on the center comparison and the distribution comparison.

Embodiment 12

The method of any of the preceding embodiments 1 to 11, wherein matching the first cluster and the second cluster based on the center comparison and the distribution comparison includes a test statistic including $$\frac{|C_1 - C_2|}{\sqrt{\sigma_1^2 + \sigma_2^2}} < T_0$$

where $C_1$ is a center of the first cluster of observation data, $C_2$ is a center of the second cluster of observation data, $\sigma_1$ is a standard deviation of the first cluster, $\sigma_2$ is a standard deviation of the second cluster, and a matching threshold is $T_0$.

Embodiment 13

The method of any of the preceding embodiments 1 to 12, wherein the threshold confidence level includes a removal confidence threshold, wherein updating the geographic database comprises:

removing the road object from the geographic database when the comparison of the updated value for the existence probability is less than the removal confidence threshold.

Embodiment 14

The method of any of the preceding embodiments 1 to 13, wherein the threshold confidence level includes an addition confidence threshold, wherein updating the geographic database comprises:

adding the road object to the geographic database when the comparison of the updated value for the existence probability is greater than the addition confidence threshold.

Embodiment 15

An apparatus for updating a geographic database, the apparatus comprising:

a geographic database including a plurality of road segments, at least one road segment associated with a road object attribute;

a memory configured to store an initial value set for an existence probability that a road object exists;

a communication interface configured to receive observation data from sensors of a plurality of vehicles, wherein a first quantity of the plurality of vehicles observed a presence of the road object and a second quantity of the plurality of vehicles observed an absence of the road object;

a controller configured to calculate a presence probability indicative of a likelihood that observation data from the first quantity of the plurality of vehicles accurately describe the road object, an absence probability indicative of a likelihood that observation data from the second quantity of the plurality vehicles accurately describe the road object, and an updated value for the existence probability that the road object exists based on the initial value set, the presence probability, and the absence probability.

Embodiment 16

The method of embodiment 15, wherein the geographic database is updated in response to a comparison of the updated value for the existence probability to the threshold confidence level.

Embodiment 17

The method of any one of the preceding embodiment 15 to 16, wherein the road object includes a traffic sign or a road divider.

Embodiment 18

The method of any one of the preceding embodiment 15 to 17, wherein the threshold confidence level includes a removal confidence threshold, wherein the controller is configured to remove the road object from the geographic database when the comparison of the updated value for the existence probability is less than the removal confidence threshold.

Embodiment 19

The method of any one of the preceding embodiment 15 to 18, wherein the threshold confidence level includes an addition confidence threshold, wherein the controller is configured to add the road object to the geographic database when the comparison of the updated value for the existence probability is greater than the addition confidence threshold.

Embodiment 20

An apparatus comprising:

a sensor configured to receive sensor data indicative of a road object;

a position detector configured to determine a geographic position associated with the road object; and a controller configured to select the sensor data indicative of the road object and the geographic position associated with the road object, wherein observation data from a plurality of vehicles including the sensor data and the geographic position are analyzed to calculate a presence probability indicative of a likelihood that observation data from a first quantity vehicles accurately describe the road object, an absence probability indicative of a likelihood that observation data from the second quantity of the plurality vehicles accurately describe the road object, and an updated value for an existence probability that the road object exists based the presence probability and the absence probability.

We claim:

1. A method for updating a geographic database, the method comprising:

determining an initial value set for an existence probability that a road object exists;

receiving observation data based on sensors of a plurality of vehicles, wherein a first quantity of the plurality of vehicles observed a presence of the road object and a second quantity of the plurality of vehicles observed an absence of the road object;

calculating, using a processor, a presence probability based on the first quantity of the plurality of vehicles for a number of positive observations, a total quantity for the plurality of vehicles, and an observation efficiency, the presence probability indicative of a likelihood that observation data from the first quantity of the plurality of vehicles accurately describe the road object;

calculating, using the processor, an absence probability based on the second quantity of the plurality of vehicles, the absence probability indicative of a likelihood that observation data from the second quantity of the plurality vehicles accurately describe the absence of the road object;

calculating, using the processor, an updated value for the existence probability that the road object exists based on the initial value set, the presence probability, and the absence probability;

performing, using the processor, a comparison of the updated value for the existence probability to a threshold confidence level; and updating the geographic database as a function of the comparison of the updated value for the existence probability to the threshold confidence level.

2. The method of claim 1, wherein the road object includes a traffic sign or a road divider.

3. The method of claim 1, wherein the updated value is calculated at a predetermined interval.

4. The method of claim 3, wherein the initial value is defined as a predetermined constant before the predetermined interval and the initial value is defined as the updated value for a subsequent iteration.

5. The method of claim 1, wherein the presence probability P (N, $n_p$|∃) is calculated from $$P(N, n_p | \exists) = \binom{N}{n_p} \epsilon^{n_p}(1 - \epsilon)^{N-n_p},$$

where N is the total quantity for the plurality of vehicles, $n_p$ is the number of positive observations, and $\epsilon$ is the observation efficiency.

6. The method of claim 5, wherein the observation efficiency $\epsilon$ is defined according to $$\epsilon = \frac{\text{number of vehicles that observed road object}}{\text{total number of vehicles that passed by}}.$$

7. The method of claim 1, wherein the absence probability, P (N, $n_p$|∄), is calculated from $$P(N, n_p | \not\exists) = \binom{N}{n_p} f^{n_p}(1 - f)^{N-n_p},$$

where N is the total quantity for the plurality of vehicles, $n_p$ is the number of positive observations, and f is a false positive rate.

8. The method of claim 7, wherein the false positive rate f is defined according to $$f = \frac{\text{number of vehicles that observed false positives for the road object}}{\text{total number of vehicles that passed by}}.$$

9. The method of claim 1, wherein the updated value for the existence probability, P (∃|$N_i$, $n_{p,i}$), that the road object exists is calculated from $$P(\exists | N_i, n_{p,i}) = \frac{P(N_i, n_{p,i} | \exists)P(\exists)}{P(N_i, n_{p,i} | \exists)P(\exists) + P(N_i, n_{p,i} | \not\exists)P(\not\exists)}$$

where the initial value includes P(∃) as a prior probability that the road object is present and P(∄) as a prior a probability that the road object is absent, where $N_i$ is a total quantity for the plurality of vehicles at an ith iteration, and $n_{p,i}$ is a number of positive observations at the ith iteration.

10. The method of claim 1, wherein the initial value set is defined according to observed data.

11. The method of claim 1, wherein the observation data includes a first cluster of observation data for a first time interval and a second cluster of observation data for a second time interval, the method comprising:

performing a center comparison of centers of the first cluster and the second cluster;
performing a distribution comparison of data distribution of the first cluster and the second cluster; and
selecting the first cluster and the second cluster based on the center comparison and the distribution comparison.

12. The method of claim 11, wherein matching the first cluster and the second cluster based on the center comparison and the distribution comparison includes a test statistic including $$\frac{|C_1 - C_2|}{\sqrt{\sigma_1^2 + \sigma_2^2}} < T_0$$

where $C_1$ is a center of the first cluster of observation data, $C_2$ is a center of the second cluster of observation data, $\sigma_1$ is a standard deviation of the first cluster, $\sigma_2$ is a standard deviation of the second cluster, and a matching threshold is $T_0$.

13. The method of claim 1, wherein the threshold confidence level includes a removal confidence threshold, wherein updating the geographic database comprises:
removing the road object from the geographic database when the comparison of the updated value for the existence probability is less than the removal confidence threshold.

14. The method of claim 1, wherein the threshold confidence level includes an addition confidence threshold, wherein updating the geographic database comprises:
adding the road object to the geographic database when the comparison of the updated value for the existence probability is greater than the addition confidence threshold.

15. An apparatus for updating a geographic database, the apparatus comprising:
a geographic database including a plurality of road segments, at least one road segment associated with a road object attribute;
a memory configured to store an initial value set for an existence probability that a road object exists;
a communication interface configured to receive observation data from sensors of a plurality of vehicles, wherein a first quantity of the plurality of vehicles observed a presence of the road object and a second quantity of the plurality of vehicles observed an absence of the road object;
a controller configured to calculate a presence probability indicative of a likelihood that observation data from the first quantity of the plurality of vehicles accurately describe the road object, an absence probability indicative of a likelihood that observation data from the second quantity of the plurality vehicles accurately describe the road object, and an updated value for the existence probability that the road object exists based on the initial value set, the presence probability, and the absence probability,
wherein the absence probability is calculated from a number of positive observations for the first quantity of the plurality of vehicles, a total quantity for the plurality of vehicles, and a false positive rate.

16. The apparatus of claim 15, wherein the geographic database is updated in response to a comparison of the updated value for the existence probability to the threshold confidence level.

17. The apparatus of claim 15, wherein the road object includes a traffic sign or a road divider.

18. The apparatus of claim 15, wherein the threshold confidence level includes a removal confidence threshold, wherein the controller is configured to remove the road object from the geographic database when the comparison of the updated value for the existence probability is less than the removal confidence threshold.

19. The apparatus of claim 15, wherein the threshold confidence level includes an addition confidence threshold, wherein the controller is configured to add the road object to the geographic database when the comparison of the updated value for the existence probability is greater than the addition confidence threshold.

20. An apparatus comprising:
 a sensor configured to generate sensor data indicative of a road object;
 a memory configured to store an initial value set for an existence probability that the road object is present for a predetermined portion of a roadway, the initial value set determined before the sensor data is generated by the sensor;
 a position detector configured to determine a geographic position associated with the road object; and
 a controller configured to select the sensor data indicative of the road object and the geographic position associated with the road object, wherein observation data from a plurality of vehicles including the sensor data and the geographic position are analyzed to calculate a presence probability indicative of a likelihood that observation data from a first quantity vehicles accurately describe the road object, an absence probability indicative of a likelihood that observation data from the second quantity of the plurality vehicles accurately describe the road object, and an updated value to modify the initial value set for the existence probability that the road object exists based the presence probability and the absence probability.

* * * * *